United States Patent [19]

Kaneko et al.

[11] Patent Number: 4,612,587
[45] Date of Patent: Sep. 16, 1986

[54] THERMOMAGNETIC RECORDING AND REPRODUCING SYSTEM

[75] Inventors: Masahiko Kaneko; Hitoshi Tamada, both of Kawasaki, Japan

[73] Assignee: Sony Corporation, Tokyo, Japan

[21] Appl. No.: 643,976

[22] PCT Filed: Dec. 20, 1983

[86] PCT No.: PCT/JP83/00445

§ 371 Date: Aug. 20, 1984

§ 102(e) Date: Aug. 20, 1984

[87] PCT Pub. No.: WO84/02603

PCT Pub. Date: Jul. 5, 1984

[30] Foreign Application Priority Data

Dec. 23, 1982 [JP] Japan .................................. 57-232433
Dec. 9, 1983 [JP] Japan .................................. 58-233239

[51] Int. Cl.[4] .......................... G11B 5/02; G11B 5/09; G11B 11/00; G11B 11/10
[52] U.S. Cl. ..................................... 360/59; 360/114; 369/13
[58] Field of Search ..................... 360/59, 114; 369/13, 369/275, 121, 283–286; 365/32, 122

[56] References Cited

U.S. PATENT DOCUMENTS

| 3,181,170 | 4/1965 | Akin ..................... 346/108 |
| 4,069,360 | 1/1978 | Yanagisawa et al. ......... 360/131 X |
| 4,151,602 | 4/1979 | Haisma .................. 365/32 |
| 4,198,692 | 4/1980 | Kobayashi ............... 365/32 X |
| 4,282,534 | 8/1981 | Shinozaki et al. .......... 369/275 X |
| 4,285,056 | 8/1981 | Bell ..................... 369/275 X |
| 4,299,680 | 11/1981 | Fontana, Jr. et al. ....... 365/32 X |
| 4,390,600 | 6/1983 | Ohta et al. ............... 428/621 |
| 4,417,290 | 11/1983 | Tanaka et al. ............ 360/131 |

FOREIGN PATENT DOCUMENTS

| 56-153546 | 11/1981 | Japan ................. 360/114 |
| 57-66549 | 4/1982 | Japan ................. 369/13 |
| 58-50639 | 3/1983 | Japan ................. 369/13 |
| 58-153244 | 9/1983 | Japan ................. 360/114 |
| 2110459 | 3/1983 | United Kingdom ........ 360/114 |

Primary Examiner—Raymond F. Cardillo
Assistant Examiner—Alyssa H. Bowler
Attorney, Agent, or Firm—Hill, Van Santen, Steadman & Simpson

[57] ABSTRACT

A thermomagnetic recording and reproducing system for use in optical magnetic disc apparatus wherein at least a first layer (1) of soft magnetic material having an easy axis of magnetization normal to the layer surface, a transparent non-magnetic intermediate layer (2), a second layer (3) of soft magnetic material having an easy axis of magnetization normal to the layer surface and a metal film or semi-metal film (4) adjacent to the second magnetized layer are superposed on one another to form a recording medium (5). In recording, a bias magnetic field is applied to the first and second magnetized layers (1) and (3) so that the magnetized layers are magnetized to have a single magnetic domain over their whole surfaces and a magnetization directed perpendicular to the layer surface. Then, a light pulse having a first wavelength of, for example, a relatively short wavelength and of which optical absorptance in the magnetized layer is relatively high is made incident on the single magnetic domain of the first magnetized film (1) to form a cylindrical magnetic domain magnetized in the direction opposite to the magnetization direction by the applied bias magnetic field, thereby recording information bits on the first magnetized layer (1). A light pulse having a second wavelength of, for example, a relatively long wavelength which passes through the first and second magnetized layers (1) and (3) is made incident on the single magnetic domain of the second magnetized layer (3) to form a cylindrical magnetic domain magnetized in the direction opposite to the magnetization direction by the applied bias magnetic field. The information is read out from the medium (5) on which the recording was made as above by utilizing the magneto optic effect.

17 Claims, 13 Drawing Figures

THERMOMAGNETIC RECORDING AND REPRODUCING SYSTEM

TECHNICAL FIELD

The present invention relates to a thermomagnetic recording and reproducing system in which the recording of an information is carried out by heat generated by the irradiation of light and the reproducing of the information is carried out by the irradiation of light and which is used in optical magnetic disc apparatus or the like.

BACKGROUND ART

There is a known thermomagnetic recording system which uses a layer of soft magnetic material having an easy axis of magnetization normal to the layer surface on which the thermomagnetic recording is performed by irradiating a laser light thereon. The system is disclosed in the publicated document of Japanese patent application unexamined No. 158005/1982 (Japanese patent application, No. 45232/1981) filed by the present applicant. The layer of soft magnetic material having an easy axis of magnetization normal to the layer surface used therein is a layer made of soft magnetic material, for example, YSmCaFeGe-series garnet such as $(YSmCa)_3(FeGe)_5O_{12}$ or the like, having uniaxial magnetic anisotropy strong in the direction normal to the layer surface and an easy axis of magnetization normal to the layer surface. The layer of soft magnetic material having an easy axis of magnetization normal to the layer surface is required to have such soft magnetic property that when this layer is used as a magnetic recording medium, the diameter of information bits to be written therein is practically determined only by a bias magnetic field, and the coercive force thereof is desired to be less than about 3 Oe, preferably about 1 Oe or below. This layer of soft magnetic material having an easy axis of magnetization normal to the layer surface is formed by growing on a crystalline substrate of rare-earth gallium garnet such as non-magnetic gadolinium gallium garnet (GGG) by the liquid phase epitaxial (LPE) growth of YSmCaFeGe-series garnet crystal or the like. The writing an information on that layer is carried out such that a bias magnetic field of a predetermined strength is first applied to the layer of the soft magnetic material so as to make the layer magnetized to have a single magnetic domain over the whole visual field thereof and magnetization directed to the direction perpendicular to the layer surface. Then, under this state, when an optical pulse is incident on the layer surface being focussed thereon, the writing of an information on the layer can be performed. The bits thus written are cylindrical magnetic domains each having a predetermined diameter and the magnetization directed to the direction opposite to the applied bias magnetic field.

The strength of the bias magnetic field applied to the layer of soft magnetic material so as to produce a single magnetic domain therein over the whole visual field thereof is selected in a range from the run-out magnetic field to the collapse magnetic field of the material, for example, between 57 Oe and 73 Oe for the above-mentioned LPE layer of $(YSmCa)_3(FeGe)_5O_{12}$. Because the coercive force, particularly magnetic wall coercive force of the layer of the soft magnetic material is extremely small and hence the bias magnetic field applied thereto can be small, the bias magnetic field applying means may be a small solenoid coil, rubber magnet or the like.

The reading-out of the information from the magnetized layer on which the recording was made is carried out such that a light, for example, a laser light is linearly polarized by a polarizer and then irradiated on the record medium. If so, when the linearly polarized light passes through the magnetized layer, it is subjected to the rotation of plane of polarization by the Faraday-effect. Thus, if this light caused in rotation is applied through an analyzer into a photo-detecting means, the output corresponding to the information bits is produced therefrom and hence the reading-out of the information is performed.

In such thermomagnetic recording system, however, the garnet film used as a recording layer presents the transmissivity for a light of wavelength longer than about 530 nm and hence the light of such long-wavelength can almost not be absorbed by the film having a thickness of 10-$\mu$m or below. Therefore, in this thermomagnetic recording system, an Argon laser having a wavelength of, for example, 488 nm is used as the light source thereof.

The present invention is to obviate the defects in the thermomagnetic recording and reproducing system mentioned above and to enable that even a semiconductor laser having a long wavelength which could not be absorbed by the magnetized film, can be used to record informations on the layer. As a result, the thermomagnetic recording and reproducing system of the invention is capable of increasing a recording density and of logical calculation.

DISCLOSURE OF INVENTION

According to the present invention, as shown in FIG. 1 or 2, at least a first layer 1 of soft magnetic material having an easy axis of magnetization normal to the layer surface, a transparent non-magnetic intermediate layer 2, a second layer 3 of soft magnetic material having an easy axis of magnetization normal to the layer surface and a metal film or semi-metal film 4 adjacent to the second layer of soft magnetic material are superposed on one another to thereby form a recording medium 5. Then, upon recording, a bias magnetic field is applied to the first and second magnetic layers 1 and 3 such that they are each magnetized to have a single magnetic domain and a magnetization directed to the direction perpendicular to the layer surfaces over their whole surfaces. Under this condition, a light pulse having a first wavelength, for example, a relatively short wavelength and absorbed with a relatively high optical absorptance in the magnetic layer is made incident on the single magnetic domain of the first magnetic layer 1 to thereby form cylindrical magnetic domains magnetized in the opposite direction to the magnetization direction of the applied bias magnetic field. Thus bit informations are recorded on the first magnetized layer 1. While, a light pulse having a second wavelength, for example, a relatively long wavelength which can pass through the first and second magnetized layers 1 and 3 is made incident on the single magnetic domain of the second magnetized layer 3 and the light is absorbed in the metal or semi-metal film to locally heat the second magnetized layer to thereby form cylindrical magnetic domains magnetized in the opposite direction to the magnetization direction of the applied bias magnetic field, thus to record bit informations on the second magnetized layer 3.

The metal film or semi-metal film 4 may be made of any metal of the transistion metals of groups Ib, IIb, IIIa, IVa, Va, VIa, VIIa and VIII, group IIIB except boron B and Pb on the periodic table and especially metals with a melting point higher than the temperature upon recording typically such as Al or Cr or any alloy of them. While, the semi-metal film may be made of Te, Bi, Sb or alloy of them.

When the film thickness of the metal film or semi-metal film 4 is less than 50 Å, light is difficult to be absorbed, but if it ecceeds 1000 Å, much energy is necessary to heat the film 4 itself. It is thus desirable that the film thickness of the metal film or semi-metal film be selected as thin as possible within the range from 50 to 1000 Å.

The reading of the information from the medium 5 on which the recording is carried out as above is performed by utilizing the magneto optic effect. That is, a pulse beam of a laser light having a relatively long wavelength, for example, He-Ne laser light or semiconductor laser light is linearly polarized by a polarizer and introduced into the medium 5. Then, when the light is passed through the first and second magnetized layers 1 and 3, its plane of polarization is subjected to Faraday rotation. In this case, depending on the presence or absence of information bits in the first and second magnetized layers 1 and 3, in other words, the presence or absence of magnetic bubble domains, its rotation angle becomes different so that if this light is introduced into an analyzer in which the intensity of the light passed therethrough is detected as an electrical signal, the information can be read out, or reproduced. Since different rotation angles can be derived depending on 4 modes in which information bits exist in both of the first and second magnetized layers, information bits exist only in the first magnetized layer, information bits exist only in the second magnetized layer and information bits exist in neither of the first and second magnetized layers, the read-out signal is possible to be quaternary or ternary outputs. Further in this case, dependent on the setting of the threshold value for the detecting level of this outputs and the polarity thereof, the detected outputs can be read out as any one of desired outputs of AND output, OR output, NAND output and NOR output which result from calculating the informations recorded on the first and second magnetized layers.

As described above, according to the system of the present invention, the recording of quaternary or ternary level of information can be carried out by how forming information bits in the first and second magnetized layers 1 and 3. Upon recording, lights of two kinds having different wavelengths, namely, a light having a relatively long wavelength and a light having a short wavelength are used. In the present invention, since the metal film or semi-metal film is formed on the recording medium, it is possible to efficiently record even a recording light of long wavelength which is absorbed with low optical absorptance relative in the magnetized layer.

According to the thermomagnetic recording system of the present invention, since the recording of quaternary or ternary information can be carried out, it is possible to carry out high density recording. Also since the calculation function can be established together with the recording, there is then an advantage that high speed logical calculation is made possible by this direct calculation. Further, if the calculated result is rewritten in the medium 5, it is not necessary to prepare a special means for storing therein the calculated result so that the apparatus can be made compact in size and further its application can be expanded.

BEST MODE FOR CARRYING OUT THE INVENTION

Example 1

Figure 1:
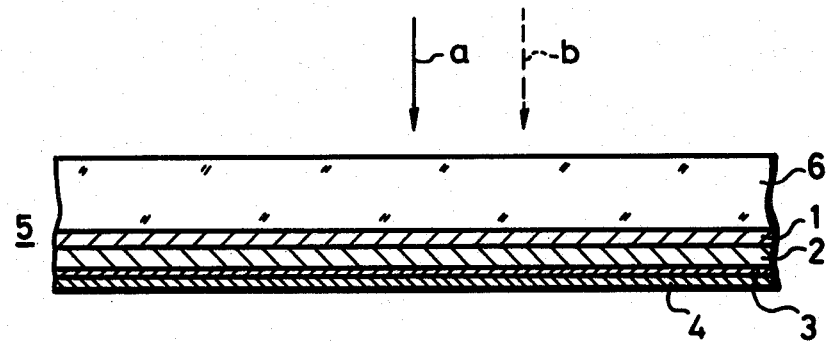
FIGS. 1 and 2 are respectively schematic crosssectional views of record media which can be used in a system of the present invention.
Figure 3:
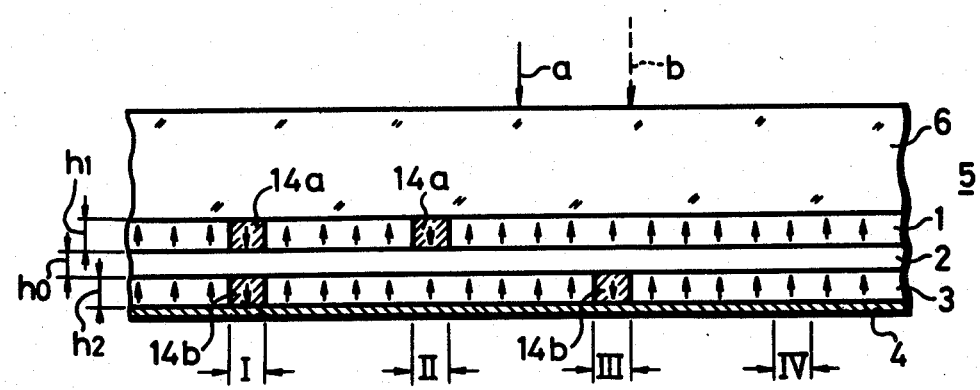
FIG. 3 is a diagram useful for explaining the recording mode thereof.

As shown in FIGS. 1 and 3, there was provided a transparent crystalline substrate 6 made of $Gd_3Ga_5O_{12}$ garnet (GGG) substrate having a thickness of, for example, 500 $\mu$m or the like on which the first layer 1 of soft magnetic material having an easy axis of magnetization normal to the layer surface, the transparent non-magnetic intermediate layer 2 and the second layer 3 of soft magnetic material having an easy axis of magnetization normal to the layer surface were formed in turn by the liquid-phase epitaxial growth technique (LPE technique) and the metal film or semi-metal film 4 is further formed thereon thus a medium 5 being formed. The first and second layers 1 and 3 of the soft magnetic material can be formed so as to have predetermined thicknesses h1 and h2, for example, 3 $\mu$m and 2 $\mu$m, respectively. The transparent non-magnetic intermediate layer 2 interposed therebetween can be made of the GGG layer having a predetermined thickness h0, for example, 5 $\mu$m. While, the metal film or semi-metal film formed on the second layer 3 may be formed of Te having a thickness of, for example, 1000 Å. The thermal conductivity of the Te semi-metal film 4 was 0.015 W/cm.deg and the melting point thereof was 450° C. The Te film 4 of 1000 Å thickness showed optical absorptance $\alpha$, 75% and reflectivity $\rho$, 25%, for example, for the He-Ne laser light of wavelength $\lambda$, 633 nm and $\alpha$, 72% and $\rho$, 26% for the semiconductor laser light of wavelength $\lambda$, 830 nm.

The recording of information on the thermomagnetic recording medium 5 thus made is such that an information can respectively be recorded on the first and second layers 1 and 3 of soft magnetic material having an easy axis of magnetization normal to the layer surface. When the informations recorded on both layers 1 and 3 are combined to each other, quaternary or ternary informations can be recorded thereon and then read out therefrom. Upon reading the informations on both layers, the calculation function can also be performed based upon both the informations and further the calculated result can be re-written in the recording medium.

The recording, namely, writing of information on the first and second layers 1 and 3 of soft magnetic material in the thermomagnetic recording medium 5 thus made is carried out by irradiating lights having wavelengths of two kinds on the recording medium from the side opposite to the side of the metal film or semi-metal film 4, namely, from the side of a substrate 6 in this example as shown by reference letters a and b in FIGS. 1 and 3. That is, the recording of information on the first layer 1 of soft magnetic material is carried out by a light having a first wavelength which is absorbed with high optical absorptance in the first magnetized layer 1, namely, a light having a relatively short wavelength such as Ar laser light having a wavelength, for example, $\lambda = 488$ nm. On the other hand, the recording of information on the second layer 2 of soft magnetic material is carried out by a light having a second wavelength which is absorbed with low optical absorptance in the first magnetized layer 1 and hence passes therethrough substantially, namely, a light having a long wavelength such as He-Ne laser light having a wavelength, for example, $\lambda = 633$ nm or semiconductor laser light having a wavelength $\lambda = 830$ nm and so on. In this case, the first and second magnetized layers 1 and 3 are made of, for example, the same material as mentioned before to have a high optical transmissivity for a light of a long wavelength region. However, since the second layer 3 has on its rear surface formed the metal film or semi-metal film 4, the light having the second wavelength can efficiently be absorbed in the metal film 4 and converted to heat energy whereby the information is recorded surely.

At first, the recording (writing) on the recording medium 5 will be described. In this case, as, for example, shown in FIG. 4, a bias magnetic field generating coil, for example, as a bias magnetic field generating means 7 is located around the medium 5. The bias magnetic field generating means produces a bias magnetic field by which the single magnetic domain can be formed in the layers 1 and 3 of soft magnetic material over the whole visual fields thereof. The intensity of this bias magnetic field is selected in the range from the run-out magnetic field Hb (by which the magnetic bubble domains are shaped in line) to the collapse magnetic field Ho (by which no magnetic bubble domains are produced). Reference numeral 8 designates a light source apparatus for generating the lights having the first and second wavelengths. When an information is recorded on, for example, the first magnetized layer 1 of the medium 5, the light source apparatus includes a light source for the light having the first wavelength, for example, the Ar laser or the like and an optical modulator for modulating the light in response to the information to be recorded and hence produces a light pulse. The light pulse from the light source apparatus 8 is linearly polarized by a polarizer 9 and then focused on the first recording layer 1 of the soft magnetic material through a half mirror 10 and an objective lens 11.

Accordingly, almost all of this light is absorbed by the first recording layer 1 which has high optical absorptance for this light, namely, the light having the wavelength $\lambda = 488$ nm and then converted to heat energy by which the magnetization of the first magnetized layer 1 is inverted at its portion irradiated with the laser beam pulse to thereby form information bits 14a as cylindrical magnetic domains (magnetic bubble domains).

When the recording of information is carried out on the second recording layer, namely, the second layer 3 of soft magnetic material, the light source apparatus 8 derives a light pulse which results from modulating a light by an information to be recorded. The light has a high transmissivity for the first magnetized layer 1, and the second magnetized layer 3. And the light has a long wavelength, and is derived from, for example, the He-Ne laser having the wavelength $\lambda = 633$ nm or the semiconductor laser having the wavelength $\lambda = 830$ nm. Similarly, this light pulse is focussed near the boundary plane between the metal film or semi-metal film 4 and the second magnetized layer 3 of the medium 5 through the polarizer 9, the half mirror 10 and the objective lens 11. Thus, almost all of the light pulse having the second wavelength emitted from the light source apparatus 8 and modulated by the recording signal is passed through the magnetized layers 1 and 3 and then almost all of the passed light pulse is absorbed in the metal film or the semi-metal film 4 behind the magnetized layer and then efficiently converted to heat energy. By this heat, the second magnetized layer 3 in contact with the metal film or semi-metal film 4 is locally heated wherein an information bit 14b is written as the same cylindrical magnetic domains (magnetic bubble domains) as mentioned before. In this case, when the pulse width is 10 $\mu$s, the information bit can be recorded by the amount of incident light more than 6 mW.

The recording of quaternary information can be carried out by forming the information bits in the first and second magnetized layers 1 and 3 as described above. That is, as shown by regions I, II, III and IV in FIG. 3, it is possible to carry out each recording of, for example, "1 1", "1 0" "0 1" and "0 0". More particularly, as shown in FIG. 3, in the region I, the information bits 14a and 14b are formed in both of the first and second magnetized layers 1 and 3, or the recording of "1" is carried out in each of both the layers so that the writing of "1 1" is carried out by the combination of both the recordings in the first and second magnetized layers. In the region II, "1" is recorded only in the first magnetized layer 1 by the information bit 14a so that the recording of "1 0" is carried out by both of the first and second magnetized layers 1 and 3. In the region III, the information bit 14b is formed, or "1" is recorded only in the second magnetized layer 3 so that the recording of "0 1" is carried out by the combination of both of the magnetized layers 1 and 3. And, in the region IV, the recording is carried out in neither of the magnetized layers 1 and 3, or the recording of "0" is carried out in both of the magnetized layers so that the recording of "0 0" is substantially carried out by the combination of both of the magnetized layers. It was confirmed that the respective magnetic domains in the first and second magnetized layers 1 and 3 were made independent and stable magnetic domains due to the interposition of the non-magnetic intermediate layer 2.

The reading of the information from the medium 5 on which the recording was carried out as above is performed by utilizing the magneto optic effect. Similarly, as, for example, shown in FIG. 4, the light source apparatus 8 produces a light pulse of a laser light having, for example, a relatively long wavelength, for example, a light pulse of He-Ne laser or semiconductor laser. This light pulse is linearly polarized by the polarizer 9 and then directed to the medium 5. Accordingly, when the light passes through the first and second magnetized layers 1 and 3, its polarization plane is rotated by the Faraday effect. In this case, depending on the presence or absence of information bits or the presence or absence of magnetic bubble domains in the first and second magnetized layers 1 and 3, its rotation angle becomes different so that if this light pulse is refracted by the half mirror 10 and introduced into an analyzer 12 and then the light therefrom is introduced into a photodetector 13, such light pulse can be detected as an output signal of an electrical signal.

Figure 4:
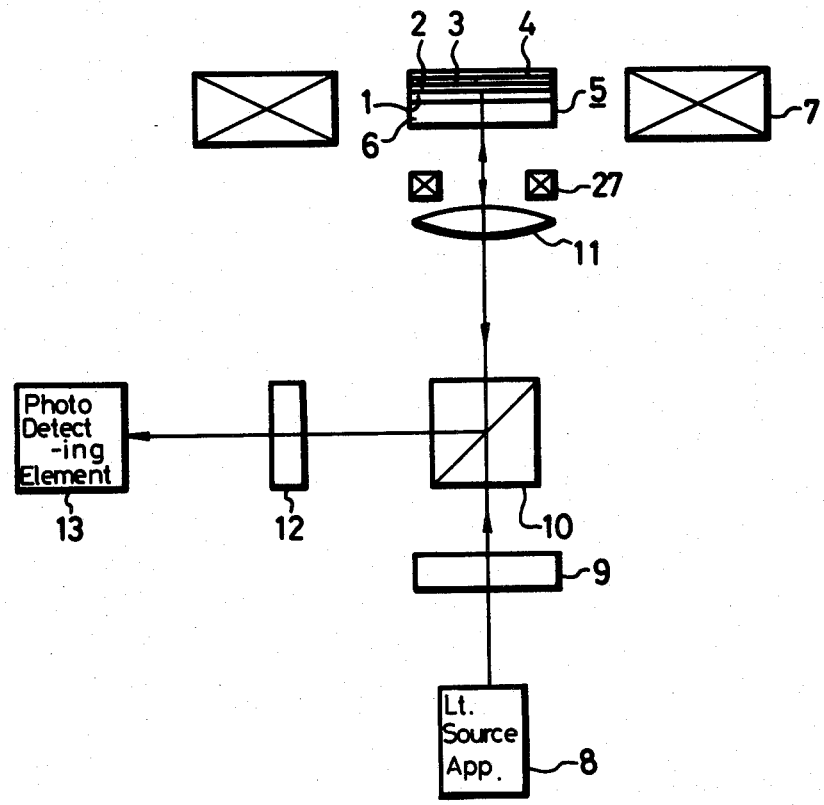
FIG. 4 is a diagram of an embodiment of a thermomagnetic recording and reproducing system according to the present invention.
Figure 5:
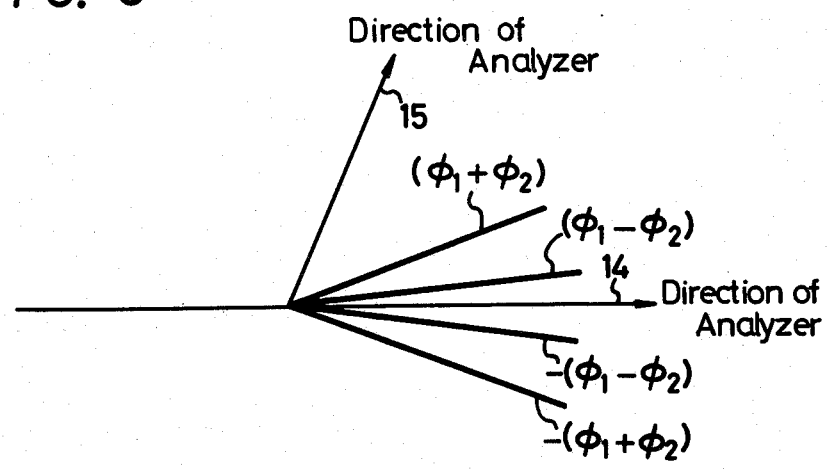
FIGS. 5 and 6 are respectively a phase diagram and a graph of an output level useful for explaining the operation thereof.

In other words, under the condition that the polarizer exists in the direction as shown by reference numeral 14 and the analyzer exists in the direction as shown by reference numeral 15 in FIG. 5, when the Faraday rotation angles caused by the first and second magnetized layers 1 and 3 are respectively taken as $\phi 1$ and $\phi 2$, the detecting light, which passes through the portions of the first and second magnetized layers 1 and 3 in which the magnetic bubble domains are formed as in the region I explained in connection with FIG. 3, is caused a Faraday rotation of polarization plane with an angle of $\phi 1 + \phi 2$, in the region II, a rotation of $\phi 1 - \phi 2$, in the region III, a rotation of $-(\phi 1 - \phi 2)$ and in the region IV, a rotation of $-(\phi 1 + \phi 2)$, respectively. Accordingly, if $\phi 1 \neq \phi 2$ is taken, when the direction of the analyzer 12 in FIG. 4 is selected to be as shown in FIG. 5, outputs of different levels shown by reference numerals 21 to 24 in FIG. 6 can be obtained from the respective regions I to IV in FIG. 3. The condition of $\phi 1 \neq \phi 2$ can be established by changing the thicknesses of the first and second magnetized layers 1 and 3 or by making both of them by different materials.

Figure 6:
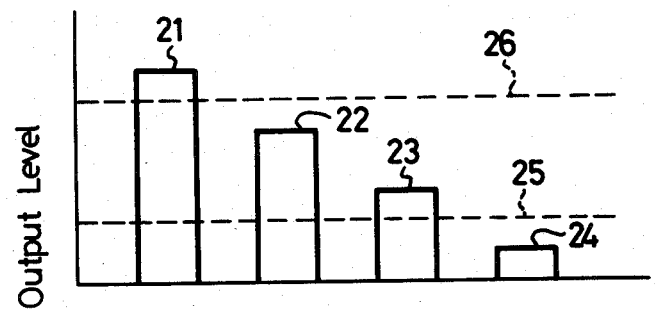

Then, as shown by broken lines 25 and 26 in FIG. 6, if the detecting level for these outputs 21 to 24 is set to either the level shown by broken line 25 or the level shown by broken line 26, the reading thereof and also the calculation function can be achieved. When, as shown in FIG. 6, the threshold value for the detection is set to the level shown by reference numeral 26, namely, the level, which is higher than the outputs 22, 23 and 24 in the regions II, III and IV but lower than the output 21 in the region I and the output "1" is derived for only an output level exceeding this threshold value and the output "0" is derived for an output level below this threshold value, it is possible to obtain an AND output of the informations recorded on the first and second magnetized layers 1 and 3. Also, if the threshold value is set to the level shown by reference numeral 25, namely, the level, which is lower than the level of the outputs 21 to 23 in the regions I to III but higher than the level of the output 24 in the region IV and the output level exceeding this level is taken as "1" and the output level below this level as "0" under which condition the output is detected, it is possible to obtain an OR output of the informations recorded in both of the first and second magnetized films 1 and 3. Similarly, if the threshold value is set to the level 25 and the output level higher than this threshold level is taken as "0" and the level lower than this threshold level as "1", it is possible to obtain a NAND output. Further, if the threshold value is set to the level 26 and the output level higher than this threshold level is taken as "0" and the level lower than this threshold level is taken as "1", it is possible to obtain a NOR output. As described above, at the same time when the reading of the information is performed, the calculation function of the information can be established.

Figure 7:
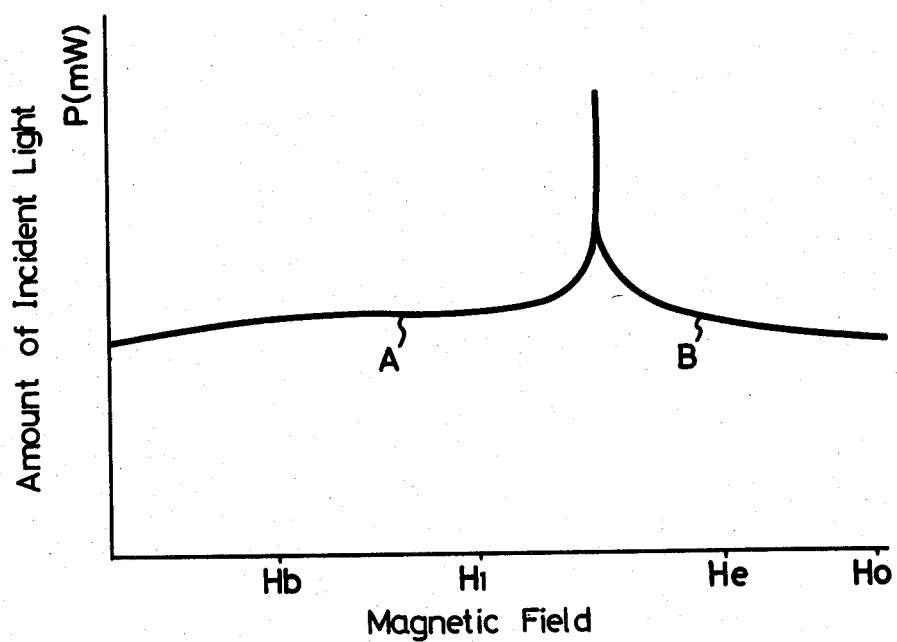
FIG. 7 is a graph useful for explaining a relation between the incident light power and a magnetic field for recording and erasing.

Further, in some cases, the calculated result, which is obtained at the same time of the readout, can be re-written in the medium 5 and then stored therein. That is, in the above recording medium, the magnetic wall coercive force of the magnetized layer is sufficiently smaller than the bias magnetic field applied thereto so that the information bits recorded as the cylindrical magnetic domains having the magnetization direction opposite to the direction of the bias magnetic field which is previously recorded information can be erased by changing the intensity of the applied bias magnetic field without changing the direction thereof and by irradiating a light thereon. In FIG. 7, curves A and B respectively indicate relations between incident light amounts and bias magnetic field for writing and erasing respectively. The writing is carried out in the upper left-hand side region of the curve A, while the erasing is carried out in the upper right-hand side region of the curve B. Accordingly, it is possible to erase the previously recorded information by a light pulse exceeding the curve B under the application of the bias magnetic field He. The bias magnetic field He can be produced by superposing a magnetic field derived by a small coil 27 provided in front of the objective lens 11 as shown in FIG. 4, on the bias magnetic field H1 for recording derived by the coil 7 in FIG. 4. On the other hand, if the pulse magnetic field for erasing is not superposed on but a light pulse of the necessary amount is applied to the magnetized layer, regardless of the presence or absence of the previously recorded information, it is possible to record the information by this light pulse finally. In this way, the calculated result can be recorded in the second layer 3.

Figure 8A:
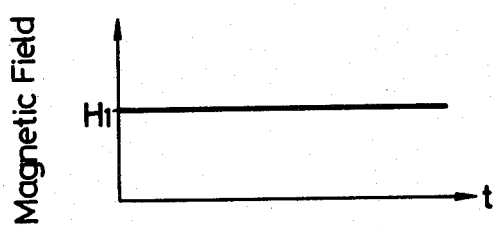
FIGS. 8a and 8b and 9a and 9b are respectively graphs useful for explaining the rewriting of calculated result.
Figure 8B:
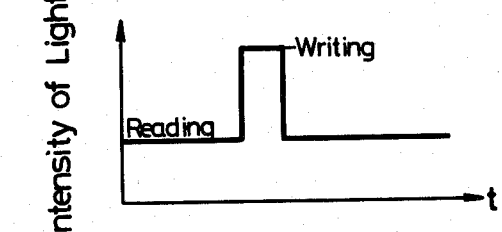
Figure 9A:
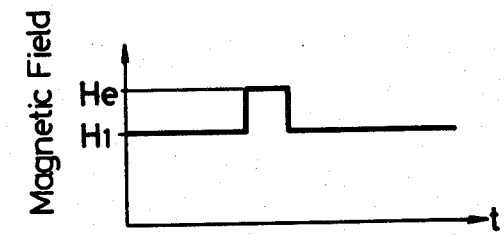
Figure 9B:
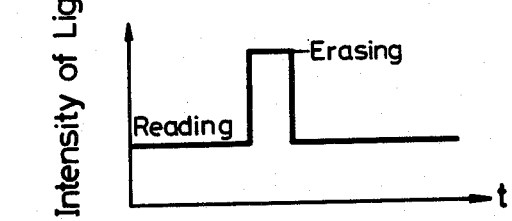

A case in which, for example, the information "0" written in the second magnetized layer 3 is re-written to the information "1" will be described. Under the condition that the constant magnetic field H1 as shown in FIG. 8A is applied to the magnetized layer 3 by the means 7, if, as shown in FIG. 8B, the laser light having, for example, the second wavelength in the form of a light pulse of a predetermined level is irradiated on the magnetized layer, the recording of "1" is carried out. While, under the condition that "1" is recorded in the magnetized layer 3, in order that this recorded information is erased and then "0" is to be recorded, if the pulse magnetic field He of an erase magnetic field level from the coil 27 as shown in FIG. 9A is applied to the magnetized layer and a light pulse, which reaches to the erase level during the above interval as shown in FIG. 9B is applied thereto, the writing of "0" can be carried out.

The reading of the information recorded on the medium 5 is not limited to by the scanning of the laser light described above but the following version is made possible. That is, a light is irradiated on the medium 5 over, for example, the whole area thereof to temporarily form in other place an information image of the layer surface and this image is made as a binary level, namely, light and shade and then read out by a television camera.

Figure 2:
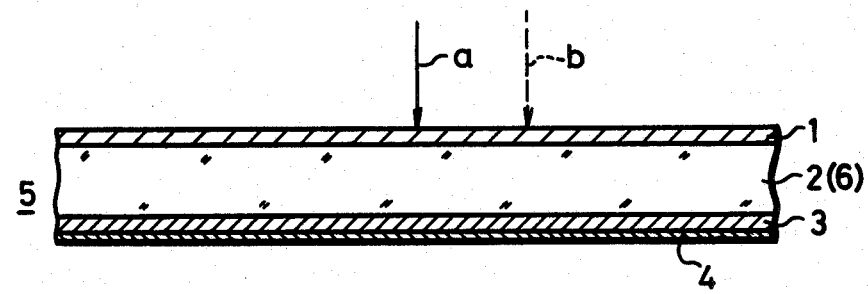

In the medium 5 shown in FIGS. 1 and 3, the first and second magnetized layers 1 and 3 are superposed through the non-magnetic layer 2 on one surface of the substrate 6. In this case, since the both layers 1 and 3 are disposed close to each other, when a light for, for example, writing information therein is focussed the use of the focussing means having a small depth of focus becomes possible. Therefore, the diameter of beam spot can be made small enough, to thereby carry out the writing and reading of information with high resolution. However, when as shown in FIG. 2 the medium 5 is formed such that the first and second layers 1 and 3 of soft magnetic material are formed on both surfaces of the crystalline substrate 6 such as GGG substrate and the like and the metal film 4 is formed on the second magnetized layer 3 in which the non-magnetic layer 2 for magnetically separating the first and second magnetized layers 1 and 3 from each other is formed of the substrate 6 itself, there is an advantage that its manufacturing process becomes easy.

Figure 10:
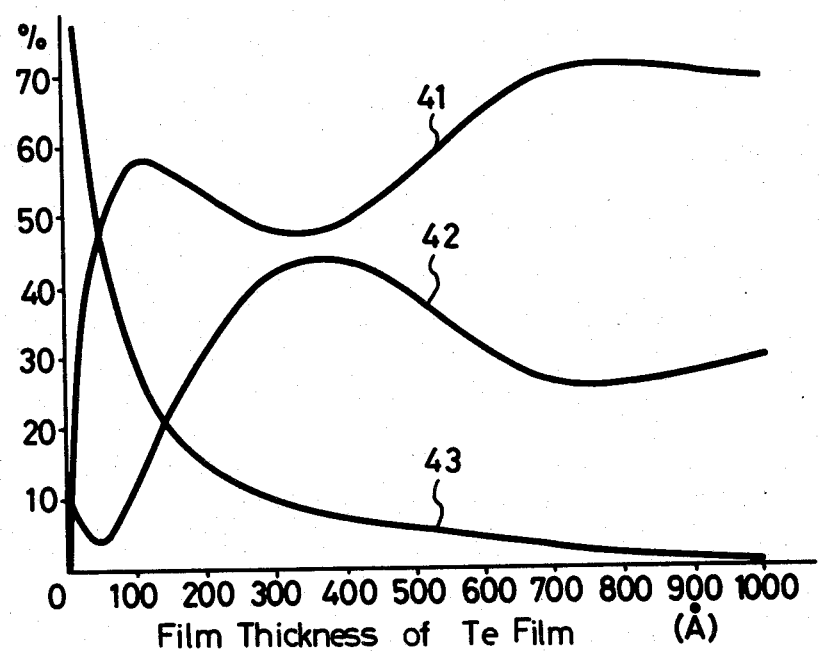
FIG. 10 is a graph showing optical characteristics relative to each thickness of the semi-metal film and FIG. 11 is a graph showing optical characteristics relative to each thickness of the metal film.

In the above example, the metal film 4 is made of Te film having a thickness of 1000 Å. Its optical absorptance $\alpha$, reflectivity $\rho$ and transmissivity $\tau$ become different depending on its film thickness. In FIG. 10, curves 41, 42 and 43 respectively indicate the relationships of $\alpha$, $\rho$ and $\tau$ to the film thickness of Te film at the wavelength $\mu = 830$ nm.

The metal film 4 is not limited to the film made of Te but may be made of Bi, Sb or alloy of them. The thermal conductivities and the melting points of Bi and Sb are 0.085 W/cm.deg, 0.18 W/cm.deg and 271° C., 631° C., respectively.

Example 2

Instead of the Te film having the thickness of 1000 Å used in the example 1, a Cr film 4 having a thickness of 400 Å was formed on the second magnetized layer 3 to thereby form the thermomagnetic recording medium 5. This recording medium 5 was radiated with a semiconductor laser light having a wavelength of 830 nm whose beam diameter is 1 $\mu$m from the side of the substrate 6 to thereby carry out the recording on the second magnetized layer 3. In this case, when the pulse width of the laser light was 1 $\mu$s, the minimum power necessary for the recording was 1.5 mW.

Example 3

Figure 11:
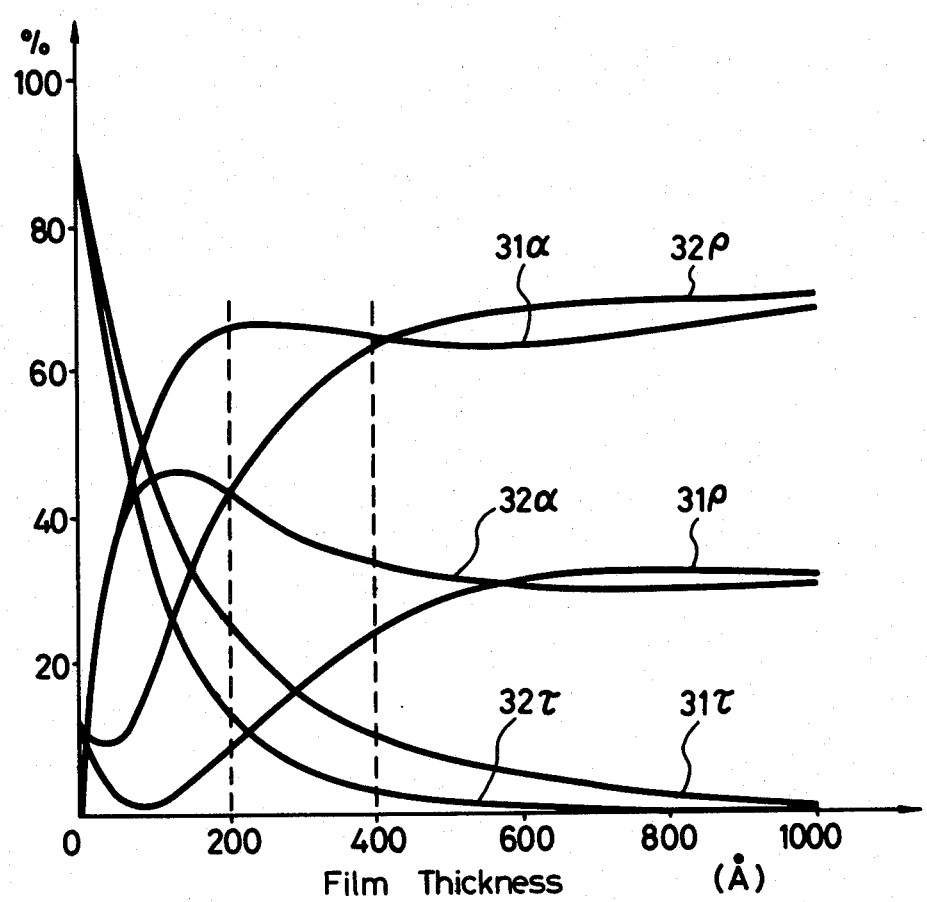

Instead of the Te film used in the example 1, Al film 4 having a thickness of 200 Å was formed on the second magnetized layer 3 to form the thermomagnetic recording medium 5. At that time, a semiconductor laser light having a wavelength of 830 nm and of which beam diameter is 1 $\mu$m was incident on the recording medium 5 from the side of the substrate 6 to thereby carry out the recording on the second magnetized layer 3. In that case, when the pulse width of the laser light was 1 $\mu$s, the minimum power necessary for the recording was 2.8 mW. The reason why the necessary power in example 3 using Al is larger than that in example 2 which employed Cr will probably be considered that the Al film has smaller optical absorptance $\alpha$ than the Cr film. FIG. 11 shows calculated results of optical characteristics of Cr and Al films of different thickness to the semiconductor laser light (wavelength $\lambda = 830$ nm). Curves 31$\alpha$ and 32$\alpha$ respectively indicate optical absorptances of the Cr and Al films, curves 31$\rho$ and 32$\rho$ reflectivities of the Cr and Al films, respectively, and curves 31$\tau$ and 32$\tau$ optical transmissivities of the Cr and Al films, respectively.

We claim:

1. In a thermomagnetic recording system, a recording medium formed by laminating a first layer of soft magnetic material having an easy axis of magnetization normal to the layer surface, a transparent non-magnetic intermediate layer, a second layer of soft magnetic material having an easy axis of magnetization normal to the layer surface and a metal film or semi-metal film being adjacent to said second magnetized layer; a bias magnetic field is applied to said recording medium such that said first and second layers are magnetized to have a single magnetic domain over their whole surfaces and a magnetization directed to the direction perpendicular to the layer surfaces, and wherein a light pulse having a first wavelength is incident on said first magnetized layer to form a cylindrical magnetic domain magnetized in the direction opposite to the magnetization direction of the applied bias magnetic field thus recording an information bit in said first magnetized layer, and wherein a light pulse having a second wavelength which passes through said first and second magnetized layers is incident on said second magnetized layer to form a cylindrical magnetic domain magnetized in the direction opposite to the magnetization direction of the applied bias magnetic field thus recording an information bit in said second magnetized layer.

2. A thermomagnetic recording system according to claim 1, wherein said metal film is made of transition metal selected from groups Ib, IIb, IIIa, IVa, Va, VIa, VIIa and VIII , and metal selected from group IIIb except boron, and Pb on the periodic table.

3. A thermomagnetic recording system according to claim 1, wherein said semi-metal film is made of Te, Bi, Sb or an alloy of two of the above of said metals.

4. A thermomagnetic recording system according to claim 2, wherein said metal film is made of Al or Cr.

5. A thermomagnetic recording system according to claim 1, wherein said layer of soft magnetic material having an easy axis of magnetization normal to the layer surface is made of soft magnetic garnet.

6. A thermomagnetic recording system according to claim 1, wherein said light having the first wavelength is an Ar laser light.

7. A thermomagnetic recording system according to claim 1, wherein said light having the second wavelength is a He-Ne laser light or semiconductor laser light.

8. A thermomagnetic recording system according to claim 1, wherein said metal or semi-metal film has a film thickness ranging from 50 to 1000 Å.

9. A thermomagnetic recording system according to claim 1, wherein said non-magnetic intermediate layer is made of non-magnetic garnet.

10. A thermomagnetic recording system according to claim 1, wherein said first and second magnetized layers are made of layers of soft magnetic material having an easy axis of magnetization normal to the layer surface which are different in Faraday rotation angle.

11. A thermomagnetic recording system according to claim 1, wherein said first and second magnetized layers are made of layers of soft magnetic material having an easy axis of magnetization normal to the layer surface which are different in thickness.

12. A thermomagnetic recording system according to claim 1, wherein said first and second magnetized layers are made of soft magnetic garnets having different compositions.

13. A thermomagnetic recording and reproducing system, including a recording medium formed by laminating a first layer of soft magnetic material having an easy axis of magnetization normal to the layer surface, a transparent non-magnetic intermediate layer, a second layer of soft magnetic material having an easy axis of magnetization normal to the layer surface and a metal film or semi-metal film being adjacent to said second magnetized layer, a bias magnetic field is applied to said recording medium such that said first and second layers are magnetized to have a single magnetic domain over their whole surfaces and a magnetization directed to the direction perpendicular to the layer surfaces, and wherein a light pulse having a first wavelength is incident on said first magnetized layer to form a cylindrical magnetic domain magnetized in the direction opposite to the magnetization direction of the applied bias magnetic field thus recording an information bit in said first magnetized layer, and wherein a light pulse having a second wavelength which passes through said first and second magnetized layers is incident on said second magnetized layer to form a cylindrical magnetic domain magnetized in the direction opposite to the magnetization direction of the applied bias magnetic field thus recording an information bit in said second magnetized layer, wherein a light which passes through said first and second magnetized layers is made incident on the magnetic recording medium at its cylindrical magnetic domains to thereby reproduce said recorded information.

14. A thermomagnetic recording and reproducing system, according to claim 13 and a threshold value for detecting outputs corresponding to the information recorded on said first and second magnetized layers is selected whereby to produce an AND-calculated output of the informations recorded on said first and second magnetized layers.

15. A thermomagnetic recording and reproducing system, according to claim 13 and a threshold value for detecting outputs corresponding to the information recorded on said first and second magnetized layers is selected whereby to produce an OR-calculated output of the information recorded on said first and second magnetized layers.

16. A thermomagnetic recording and reproducing system, according to claim 13 and a threshold value for detecting outputs corresponding to the information recorded on said first and second magnetized layers is selected whereby to produce a NAND-calculated output of the information recorded on said first and second magnetized layers.

17. A thermomagnetic recording and reproducing system, according to claim 13 and a threshold value for detecting outputs corresponding to the information recorded on said first and second magnetized layers is selected whereby to produce a NOR-calculated output of the information recorded on said first and second magnetized layers.

* * * * *